(12) United States Patent
Storm

(10) Patent No.: US 11,886,279 B2
(45) Date of Patent: Jan. 30, 2024

(54) RETRIEVAL OF LOG INFORMATION FROM A MEMORY DEVICE

(71) Applicant: Micron Technology, Inc., Boise, ID (US)

(72) Inventor: Shawn Storm, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 35 days.

(21) Appl. No.: 17/555,165

(22) Filed: Dec. 17, 2021

(65) Prior Publication Data

US 2023/0195556 A1    Jun. 22, 2023

(51) Int. Cl.
G06F 11/00 (2006.01)
G06F 11/07 (2006.01)
H02J 50/20 (2016.01)

(52) U.S. Cl.
CPC .......... *G06F 11/079* (2013.01); *G06F 11/073* (2013.01); *G06F 11/0751* (2013.01); *G06F 11/0787* (2013.01); *H02J 50/20* (2016.02)

(58) Field of Classification Search
None
See application file for complete search history.

(56) References Cited

U.S. PATENT DOCUMENTS

| | | | |
|---|---|---|---|
| 4,685,047 A | 8/1987 | Phillips | |
| 7,098,642 B2 | 8/2006 | Rose | |
| 10,008,889 B2 * | 6/2018 | Bell | H02J 13/00024 |
| 10,637,589 B1 * | 4/2020 | Chakraborty | H04B 17/318 |
| 2004/0059865 A1 * | 3/2004 | McGuffin | G06F 11/328 |
| | | | 711/100 |
| 2011/0051577 A1 * | 3/2011 | Feliss | G11B 5/6005 |
| 2019/0319675 A1 * | 10/2019 | Dvorsky | G06F 1/3206 |
| 2022/0050688 A1 * | 2/2022 | Norton | G06F 9/4403 |

OTHER PUBLICATIONS

Google Scholar/Patents search—text refined (Year: 2023).*

* cited by examiner

*Primary Examiner* — Christopher S McCarthy
(74) *Attorney, Agent, or Firm* — Brooks, Cameron & Huebsch, PLLC

(57) ABSTRACT

Information corresponding to a health of a memory device or a functional state of the memory device, or both, is written to the memory device. Radio frequency (RF) signaling is used to provide power to certain components of the memory device. Information corresponding to the health of the memory device or the functional state of the memory device, or both, is retrieved from the memory device over-the-air in response to the RF signaling.

24 Claims, 5 Drawing Sheets

RETRIEVAL OF LOG INFORMATION FROM A MEMORY DEVICE

TECHNICAL FIELD

Embodiments of the disclosure relate generally to memory sub-systems, and more specifically, relate to retrieval of log information from a memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
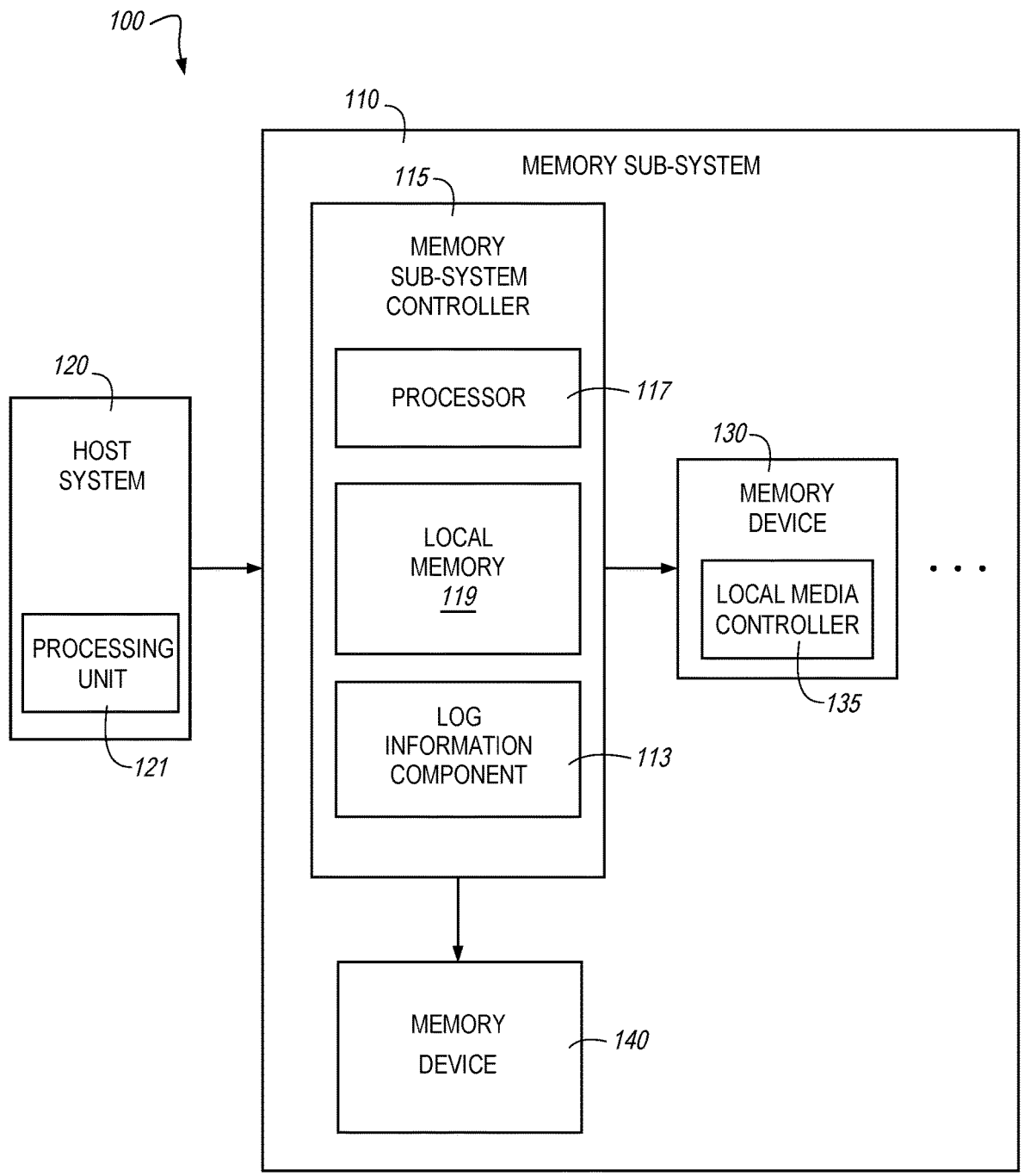
FIG. 1 illustrates an example computing system that includes a memory sub-system in accordance with some embodiments of the present disclosure.

Aspects of the present disclosure are directed to retrieval of log information from a memory device in a memory sub-system, in particular to memory sub-systems that include logic circuitry to facilitate retrieval of log information from the memory device. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a not- and or "negative-and" (NAND) memory device (also known as flash technology). Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs), etc. For example, a SLC can store one bit of information and has two logic states, while a TLC can store multiple bits of information and has eight logic states.

Memory sub-systems and/or components of the memory sub-system(s) can, during the course of their lifetime, experience various types of failures and/or fault conditions. For example, a memory sub-system and/or the constituent components thereof, such as memory devices, controllers, caches, etc. can experience conditions in which at least some of the components of the memory sub-system cease to properly function and/or become entirely inoperable, thereby rendering the memory sub-system unable to operate as intended or, in a worst-case scenario, unable to operate at all (e.g., the memory sub-system or at least one component of the memory sub-system is "bricked").

As used herein, the term "failure" or "fatal fault," generally refers to a condition in which at least one component of a memory sub-system has become inoperable, while the term "non-fatal fault" generally refers to a condition in which at least one component of a memory sub-system has experienced one or more faults and/or errors that have caused the component(s) and therefore the memory sub-system to operate with sub-standard performance. The term "fault condition" generally refers to a description of a cause or reason related to how a fault and/or error manifested itself into the component(s) of the memory sub-system that experience the fault and/or error, regardless if such fault and/or error is "fatal" or "non-fatal" and/or regardless is such fault and/or error is recoverable (in the case of a non-fatal fault) or non-recoverable (in the case of a fatal fault).

If the memory sub-system and/or the components of the memory sub-system experience such failures and/or fault conditions, it can be desirable to retrieve information, such as log information, stored by the components of the memory sub-system to analyze and/or triage the log information to determine potential causes that led to the failures and/or fault conditions experienced by the components of the memory sub-system. As used herein, the term "triage" generally refers to operations that are performed to assess the urgency of various conditions that led to the failures and/or fault conditions experienced by the memory sub-system. This can allow for the cause(s) of the failures and/or fault conditions experienced by the memory device to be narrowed in an effort to determine the best way to address such failures and/or fault conditions, which can expedite the resolution of problems associated with the memory sub-system that led to the failures and/or fault conditions. It may also be desirable to retrieve and analyze such information to attempt to remedy circumstances that led to the failures and/or fault conditions experienced by the components of the memory sub-system in an effort to diagnose and/or repair components of the memory sub-system. It may also be desirable to retrieve and analyze such information to attempt to gain an understanding of the circumstances that led to the failures and/or fault conditions experienced by the components of the memory sub-system in an effort to reduce the likelihood of components of a memory sub-system experiencing a fault condition and/or a failure under similar circumstances.

However, if the memory sub-system and/or the constituent components thereof have become inoperable due to the failures and/or fault conditions experienced by the components of the memory sub-system, retrieval of the log information may be difficult, costly, and/or time-consuming, which can exacerbate the difficulty of analyzing the log information to diagnose, understand, and/or remedy the circumstances that led to the failures and/or fault conditions experienced by the components of the memory sub-system.

As an example, some approaches may require that the memory sub-system is decoupled from a host computing system and physically transported to a facility that utilizes specialized equipment to attempt to analyze and/or triage log information that may be stored within the memory sub-system (e.g., within a memory device of the memory sub-system). In many instances, the specialized equipment can be extremely costly, which, in turn, means that retrieval and/or analysis of the log information can be quite expensive. In addition, the retrieval and/or analysis of the log information in such approaches can be time-intensive, which can become a burden on the owner of the memory sub-system as they wait for the retrieval and/or analysis of the log information to be completed. Further, under some circumstances, analysis and/or triage of log information stored within the memory sub-system can, in some approaches, require that components of the memory sub-system are removed (e.g., de-soldered) from the memory sub-system, which can incur additional time and/or cost.

Aspects of the present disclosure address the above and other deficiencies through the use of special purpose circuitry (e.g., the "logic circuitry" described herein) that is added to the memory sub-system. As described in more detail herein, this circuitry can control writing of log information to a dedicated memory resource of the memory sub-system and receive radio frequency (RF) signaling to power the special purpose circuitry and the dedicated memory resource to access, retrieve, and/or analyze the log information in the event that the memory sub-system has experienced a failure and/or fault condition that has caused the memory sub-system to become inoperable.

Aspects of the present disclosure are not limited to instances in which the memory sub-system has experienced a failure and/or fault condition that has caused the memory sub-system to become inoperable, however. For example, in some embodiments, the special purpose circuitry can also expedite resolution of non-fatal faults, such as thermal throttling and/or thermal gating performance, experienced by the memory sub-system during operation that can often times incur protracted delays in recovering information from the memory sub-system. As will be appreciated, thermal throttling or "thermal gating" operations can be performed to reduce a temperature of the memory sub-system. For example, during operation of the memory sub-system, conditions can occur in which components of the memory sub-system reach or exceed temperatures that are above a threshold temperature that allows for the memory sub-system to properly function. If such conditions occur, operations performed by the memory device can be throttled in an effort to reduce the temperature of the components of the memory sub-system to bring the memory sub-system below the threshold temperature. Performance of such operations can result in reduced performance of the memory sub-system thereby giving rise to a "non-fatal fault." Examples of non-fatal faults are not so limited; however, and another example of a non-fatal fault that can enjoy expedited resolution utilizing the special purpose circuitry described herein can be an unsafe shut down condition experienced by the memory sub-system in which an unexpected voltage loss and/or unexpected power loss occurs, and the memory sub-system is powered down without going through a normal power down sequence.

Yet other aspects of the present disclosure are directed to a RF signal generation device that is external to the memory sub-system. The RF signal generation device includes a RF signal generator, which includes circuitry configured to generate RF signals and apply the RF signals to a memory sub-system to power (e.g., energize) the special purpose circuitry of the memory sub-system mentioned above. The RF signal generation device can include hardware circuitry (e.g., a processing device and/or a memory component) that can be configured to access, receive, and/or analyze the log information described above from the memory sub-system in the event that the memory sub-system has experienced a failure and/or fault condition, as described in more detail herein.

Advantageously, aspects of the disclosure described herein can allow for access, retrieval, and/or analysis of the log information which, as mentioned above can be stored in a dedicated memory resource associated with the logic circuitry, in the absence of removal of the memory sub-system from a host computing system and physically transportation of the memory sub-system to a facility that utilizes specialized equipment to attempt to analyze and/or triage log information that may be stored within the memory sub-system. Stated alternatively, embodiments herein allow for the log information stored by the memory sub-system to be accessed, retrieved, and/or analyzed "on site" (e.g., at a location in which the memory sub-system is deployed). This can reduce the costs and time associated with the approaches described above.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO- DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 includes a processing device 121. The processing unit 121 can be a central processing unit (CPU) that is configured to execute an operating system. In some embodiments, the processing unit 121 comprises a complex instruction set computer architecture, such an x86 or other architecture suitable for use as a CPU for a host system 120.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a log information component 113. Although not shown in FIG. 1 so as to not obfuscate the drawings, the log information component 113 can include various circuitry (e.g., the logic circuitry 222, the memory resource 224, and/or the RF energize circuitry 226 illustrated in connection with FIG. 2, herein) to store log information generated during operation of the memory sub-system 110. Further, in some embodiments, the log information component 113 can include various circuitry to facilitate performance of operations to receive radio frequency (RF) signaling to provide power to at least some components the log information component 113 to allow the log information written to the log information component 113 to be transferred to circuitry (e.g., the RF signal generation device 450 illustrated in connection with FIG. 4, herein). The log information component 113 may be referred to herein in the alternative as "logic circuitry," a "controller," or a "processor," given the context of the disclosure.

Figure 2:
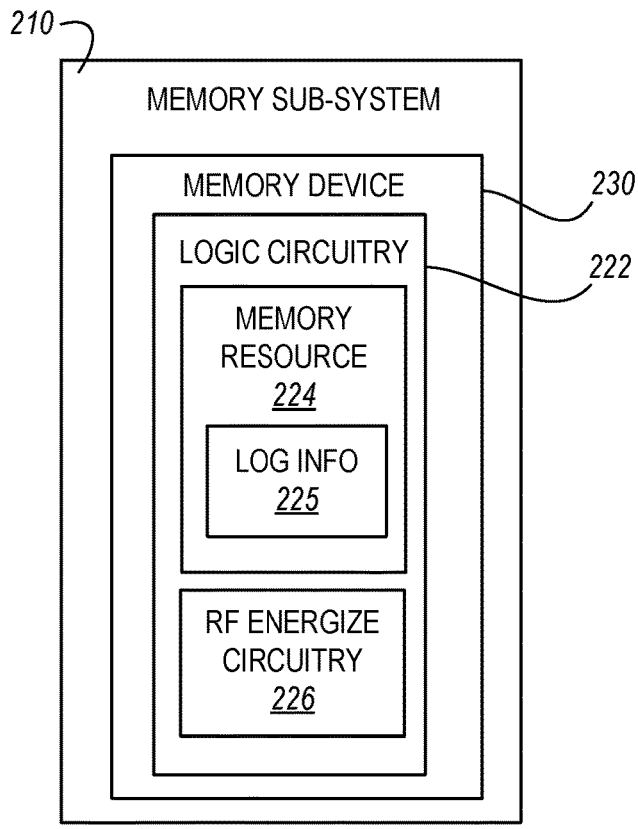
FIG. 2 illustrates an example memory sub-system in accordance with some embodiments of the present disclosure.

As described in more detail herein, in some embodiments, the log information component 113 can control writing, to a memory resource, such as the memory resource 224 of FIG. 2, information corresponding to a health of the memory device and/or a functional state of the memory device. The log information component 113 can receive RF signaling from circuitry external to the memory sub-system 110 to provide power to the log information component 113. The log information component 113 can then control transfer of the information corresponding to the health of the memory device and/or the functional state of the memory device to the circuitry external to the memory device. In some embodiments, the log information component 113 can include special purpose circuitry in the form of an ASIC, FPGA, state machine, and/or other logic circuitry that can allow the log information component 113 to orchestrate and/or perform operations described herein involving the memory device 130 and/or the memory device 140.

In some embodiments, the memory sub-system controller 115 includes at least a portion of the log information component 113. For example, the memory sub-system controller 115 can include a processor 117 (processing device) configured to execute instructions stored in local memory 119 for performing the operations described herein. In some embodiments, the log information component 113 is part of the host system 110, an application, or an operating system. In yet other embodiments, the log information component 113 is resident on the memory device 130.

In some embodiments, the memory sub-system 110, and hence the log information component 113, can be resident on a mobile computing device such as a smartphone, laptop, phablet, Internet-of-Things device, autonomous vehicle, or the like. As used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to an IoT device, among other types of edge computing devices.

FIG. 2 illustrates an example memory sub-system 210 in accordance with some embodiments of the present disclosure. The memory sub-system 210 can be analogous to the memory sub-system 110 illustrated in FIG. 1, herein. As shown in FIG. 2, the memory sub-system 210 includes a memory device 230 and logic circuitry 222, which includes a memory resource 224 and radio frequency (RF) energize circuitry 226. The logic circuitry can, in some embodiments, be analogous to the log information component 113 illustrated in FIG. 1, herein. Accordingly, in some embodiments, the logic circuitry can include a controller and/or a processing device or other processor that includes hardware circuitry to execute instructions to perform various tasks.

Under certain conditions, the logic circuitry 222 can be configured to be powered from a power source that is external to the memory sub-system 210. For example, the logic circuitry 222 can, in the event of a failure or fault condition experienced by the memory sub-system 210 receive RF power from circuitry external to the memory sub-system 210, such as the RF generation device 450 illustrated in FIG. 4, herein. Accordingly, the logic circuitry 222 can be configured to be (or to be become) physically isolated or decoupled from internal voltage rails of the memory sub-system that are used to provide power to other components of the memory sub-system. Stated alternatively, the logic circuitry 222 can be an "independent circuit" such that the logic circuitry 222 is operable independent of other components of the memory sub-system 210 and/or the memory device 230 due to the ability of the logic circuitry 222 to receive RF power from circuitry that is external to the memory sub-system 210.

In some embodiments, the logic circuitry 222 can control processing of log information 225 and writing of log information 225 to the memory resource 224 during operation of the memory sub-system 210. In some embodiments, the memory resource 224 can be a dedicated memory resource that is configured to store the log information 225, as opposed to user data or other data stored by, for example, the memory device 230. The log information 225 can include Self-Monitoring, Analysis and Reporting Technology (SMART) log information that is used to monitor and/or record health characteristics of the memory device 230 over time. In general, SMART is a monitoring system utilized by some memory devices to detect and report various indicators of drive reliability with the intent of anticipating imminent hardware failures. SMART can include the use of counters to track memory accesses to determine how many times and/or how frequently the memory device is accessed.

Embodiments are not limited to writing and/or storing of SMART log information, however, and other log information 225 that corresponds to health characteristics of the memory device 230 and/or a functional state of the memory device 230 can be written to the memory resource 224 during operation of the memory sub-system 210 and/or the memory device 230. For example, a quantity of program-erase cycles (PECs) experienced by the memory device 230 can be indicative of the health of the memory device 230 and, accordingly, information corresponding to a quantity of PECs experienced by the memory device can be included in the log information 225 written to the memory resource 224. Other non-limiting examples of information that can be indicative of the health of the memory device 230 that can be included in the log information 225 can include cross-temperature characteristics of the memory device 230, wear leveling characteristics of the memory device 230, and/or determined voltage drift characteristics of the memory device 230, among others.

In some embodiments, the log information 225 can include functional state information corresponding to the memory device 230. Such information can include error log information that can include a record of all errors experienced (either hardware errors, software errors, or both) by the memory device 230, persistent event log information, encoded operational mode information, relative time information (e.g., of events occurring within the memory sub-system), information corresponding to state machine monitoring, controller information, status bit information, and/or operational failure log information 225 associated with the memory device 230, among others.

The RF energize circuitry can include hardware circuitry that is configured to receive a RF signal and convert the RF signal into an electrical power signal to provide power (e.g., energize) the logic circuitry 222. As described above, the RF signal can be received when the memory sub-system 210 and/or the memory device 230 has experienced a failure or fault condition. The RF signal can be generated by an RF generation device (e.g., the RF generation device 450 illustrated in FIG. 4, herein). In some embodiments, in response to receipt of the RF signal, the RF energize circuitry can provide power to the logic circuitry 222 and/or the memory resource 224 such that the log information 225 written to the memory resource 224 can be accessed, retrieved, and/or analyzed in the event that the memory sub-system 210 and/or the memory device 230 has experienced the failure and/or fault condition. In some embodiments, the RF energize circuitry providing power to the logic circuitry 222 and/or the memory resource 224 can be drawn from the RF signal. Stated alternatively, in some embodiments, the logic circuitry 222 and/or the memory resource 224 are powered entirely (or at least partially) using RF power drawn from the RF signal. This can allow for the log information 225 to be accessed, retrieved, and/or analyzed without requiring components storing such log information 225 to be physically removed from the memory sub-system 210.

In a non-limiting example, an apparatus a memory resource 224 resident on a memory device 230. Logic circuitry 222 is also resident on the memory device 230 and coupled to the memory resource 224. As used herein, the term "resident on" refers to something that is physically located on a particular component. For example, the logic circuitry 222 being "resident on" the memory device 230 refers to a condition in which the hardware circuitry that comprises the logic circuitry 222 is physically located on the memory device 230. The term "resident on" can be used interchangeably with other terms such as "deployed on" or "located on," herein.

Continuing with this example, the logic circuitry 222 can control writing of information corresponding to a health of the memory device 230 or a functional state of the memory device 230, or both to the memory resource 224 (e.g., the log information 225). The logic circuitry 222 can receive radio frequency (RF) signaling from circuitry external (e.g., the RF signal generation device 450 illustrated in connection with FIG. 4, herein) to the memory device 230 to provide power to the logic circuitry 222 and/or the components associated with the logic circuitry 222. The logic circuitry 222 can, in some embodiments, cause the information corresponding to the health of the memory device 230 or the functional state of the memory device 230, or both, to be transferred to the circuitry external to the memory device 230.

Embodiments contemplated within the scope of the disclosure are not limited to transfer of information corresponding to the health of the memory device 230 or the functional state of the memory device 230. For example, in some embodiments, the logic circuitry 222 can be configured to cause information identifying the memory device 230 to be transferred to the circuitry external to the memory device. The information identifying the memory device 230 can include information such as a serial number of the memory device 230, a model number of the memory device 230, and/or other information that may identify a manufacture date, location, batch number, or any other such information associated with the memory device 230.

As described herein, the logic circuitry 222 can receive the RF signaling from the circuitry external to the memory device 230 to provide the power to the logic circuitry 222 and cause the information corresponding to the health of the memory device 230 or the functional state of the memory device 230, or both, to be transferred to the circuitry external to the memory device 230 after the memory device 230 has experienced a fault condition.

As described in more detail in connection with FIG. 4, herein, the circuitry external to the memory device 230 can include a radio frequency (RF) signal generator, a memory component, and/or a controller coupled to the RF signal generator and the memory component. In such embodiments, the controller associated with the circuitry external to the memory device 230 can control generation of the RF signaling to provide the power to the logic circuitry 222, control receipt of the information corresponding to the health of the memory device 230 or the functional state of the memory device 230, or both, and/or control performance of an operation using the information corresponding to the health of the memory device 230 or the functional state of the memory device 230 (e.g., the log information 225), or both, to determine a cause of failure for the memory device 230. Embodiments are not so limited, and, as described herein, the controller associated with the circuitry external to the memory device 230 can control generation of the RF signaling to provide the power to the logic circuitry 222, control receipt of the information corresponding to the health of the memory device 230 or the functional state of the memory device 230, or both, and/or control performance of an operation using the information corresponding to the health of the memory device 230 or the functional state of the memory device 230 (e.g., the log information 225), or both, to determine information relating to a fault condition that does not involve a failure experienced by the memory device 230.

The fault condition can refer to an event experienced by the memory device 230 in which the memory device 230 has experienced a failure such that the memory device 230 is inoperable. For example, the fault condition can be indicative of a condition in which the memory device has experienced a failure that renders the memory device 230 inoperable. Embodiments are not so limited, however, and in some embodiments, the fault condition can be indicative of an event experienced by the memory device 230 in which the memory device 230 experiences a non-fatal fault condition, as described above. Examples of non-fatal fault conditions include recoverable errors experienced by the memory device 230 (e.g., silent and/or undetected error conditions) that generally do not have a major impact on the functionality of the memory device 230. That is, non-fatal faults can include conditions experienced by the memory device 230 in which the memory device 230 remains operable such that specifications associated with the memory device 230 are not violated. In some embodiments, the fault condition can be determined by a user of the memory device 230 or by the memory device 230 itself in the absence of user control.

Continuing with this non-limiting example, in some embodiments, the logic circuitry 222 can determine that information corresponding to the health of the memory device 230 and/or the functional state of the memory device 230, e.g., the log information 225, has been stored by the memory resource 224 for greater than a threshold period of time. In such scenarios, the logic circuitry 222 can control writing of the information corresponding to the health of the memory device 230 or the functional state of the memory device 230, or both, to the memory resource 224 in response to the determination such that information corresponding to the health of the memory device 230 or the functional state of the memory device 230, or both, that has been stored by the memory resource 224 for greater than the threshold period of time is overwritten.

By overwriting information corresponding to the health of the memory device 230 or the functional state of the memory device 230, or both, that has been stored by the memory resource 224 for greater than the threshold period of time, an amount of physical memory resources required to store the information corresponding to the health of the memory device 230 and/or the functional state of the memory device 230 can be reduced. Further, by overwriting the information corresponding to the health of the memory device 230 and/or the functional state of the memory device 230 periodically, it is possible to ensure that the information corresponding to the health of the memory device 230 and/or the functional state of the memory device 230 is as current as possible in the event of a fault condition and/or failure of the memory device 230.

In other embodiments, the logic circuitry 222 can determine that a quantity of data associated with previously written information corresponding to the health of the memory device 230 and/or the functional state of the memory device 230, e.g., the log information 225, that has been written to the memory resource 224 meets or exceeds a quantity of storage locations available to the memory resource 224. In such embodiments, the logic circuitry 222 can control writing of the information corresponding to the health of the memory device 230 or the functional state of the memory device 230, or both, to the memory resource in response to the determination such that the previously written information corresponding to the health of the memory device 230 or the functional state of the memory device 230, or both, is overwritten.

By overwriting information corresponding to the health of the memory device 230 and/or the functional state of the memory device 230 when the previously written information corresponding thereto meets or exceeds a quantity of storage locations available to the memory resource 224, an amount of physical memory resources required to store the information corresponding to the health of the memory device 230 and/or the functional state of the memory device 230 can be reduced. Further, by overwriting the information corresponding to the health of the memory device 230 and/or the functional state of the memory device 230 when an amount of previously written data meets or exceeds a quantity of storage locations available to the memory resource 224, it is possible to ensure that the information corresponding to the health of the memory device 230 and/or the functional state of the memory device 230 is as current as possible in the event of a fault condition and/or failure of the memory device 230 while minimizing an amount of storage resources required by the memory resource 224.

In some embodiments, the logic circuitry 222 can extract relevant information from the information corresponding to the health of the memory device 230 or the functional state of the memory device 230, or both, to reduce a quantity of bits associated with the information corresponding to the health of the memory device 230 or the functional state of the memory device 230, or both, prior to controlling writing of the information corresponding to the health of the memory device 230 or the functional state of the memory device 230, or both to the memory resource 224. By processing the information corresponding to the health of the memory device 230 and/or the functional state of the memory device 230 to reduce the quantity of bits associated with the information corresponding to the health of the memory device 230 and/or the functional state of the memory device 230, it may be possible to minimize an amount of physical memory resources required to store the information corresponding to the health of the memory device 230 and/or the functional state of the memory device 230 while maintain current and accurate information in the event that the memory device 230 experiences a fault condition and/or a failure.

Figure 3:
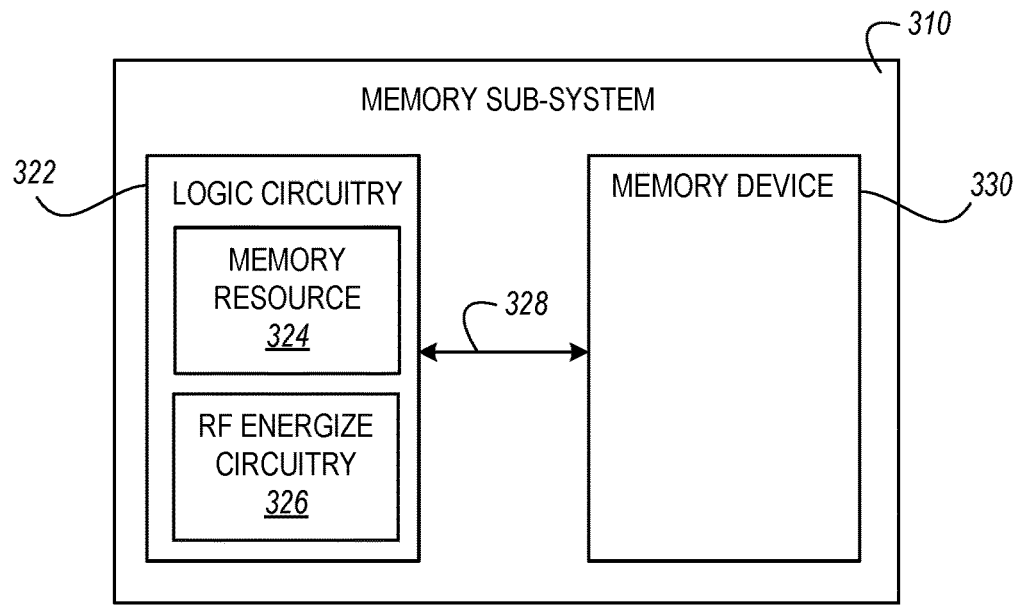
FIG. 3 illustrates another example memory sub-system in accordance with some embodiments of the present disclosure.

FIG. 3 illustrates another example memory sub-system 310 in accordance with some embodiments of the present disclosure. The memory sub-system 310 can be analogous to the memory sub-system 110 illustrated in FIG. 1 and/or the memory sub-system 210 illustrated in FIG. 2, herein. As shown in FIG. 3, the memory sub-system 310 includes a memory device 330 and logic circuitry 322, which includes a memory resource 324 and radio frequency (RF) energize circuitry 326. The memory device 330, the logic circuitry 322, the memory resource 324, and the radio frequency (RF) energize circuitry 326 can be analogous to the memory device 230, the logic circuitry 222, the memory resource 224, and the radio frequency (RF) energize circuitry 226 illustrated in FIG. 2, herein.

In contrast to the embodiment illustrated in FIG. 2, in the embodiment illustrated in FIG. 3, the logic circuitry 322 is resident on the memory sub-system 310 but is not resident on the memory device 330. As shown in FIG. 3, the logic circuitry 322 is coupled to the memory device 330 via a communication path 328. The communication path 328 can be a physical communication path that allows data to be transferred between the logic circuitry 322 (e.g., the memory resource 324 of the logic circuitry 322) and the memory device 330. Non-limiting examples of a communication path 328 can be a peripheral component interconnect express (PCIe) communication path; however, other suitable interfaces, buses, and/or communication paths are contemplated within the scope of the disclosure.

Figure 4:
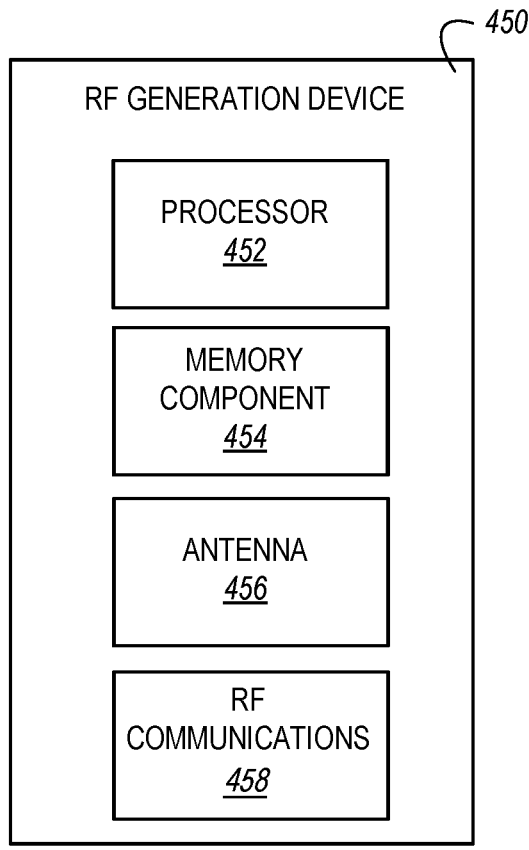
FIG. 4 illustrates an example radio frequency (RF) signal generation device in accordance with some embodiments of the present disclosure.

FIG. 4 illustrates an example radio frequency (RF) signal generation device 450 in accordance with some embodiments of the present disclosure. As shown in FIG. 4, the RF signal generation device 450 includes a processor 452, a memory component 454, an antenna 456, and RF communication circuitry 458. The processor 452 can include hardware circuitry configured to process instructions to control operation of the RF signal generation device 450. The processor 452 can control generation of RF signals that can be transmitted via the antenna 456 to circuitry that is external to the RF signal generation device. In some embodiments, the processor 452 can control generation of such RF signals such that the RF signals are transmitted via the antenna 456 over-the-air as opposed to via a physical signal path, such as a cable or wire. As described herein, the RF signals transmitted by the RF signal generation device 450 can include signals indicative of RF power transmission and can be used to provide power (e.g., to energize) circuitry that is external to the RF signal generation device 450, such as the logic circuitry 222 and/or the logic circuitry 322 illustrated in FIG. 2 and FIG. 3, herein. In addition to, or in the alternative, the RF signals transmitted by, or received by, the RF signal generation device 450 can be used to transfer information from the circuitry external to the RF signal generation device 450 to the RF signal generation device 450. Such information can include data stored (e.g., in the dedicated memory resource of the logic circuitry, log information, etc.) by the memory device and/or can include data corresponding to a health of the memory device, a functional state of the memory device, etc., as described herein.

The RF communication circuitry 458 can include hardware circuitry configured to control over-the-air communication (e.g., RF communication) between the RF signal generation device 450 and circuitry external to the RF signal generation device 450, such as the logic circuitry 222 illustrated in FIG. 2 and/or the logic circuity 322 illustrated in FIG. 3, herein. For example, in some embodiments, the RF communication circuitry 458 can facilitate transmission of RF signals from the RF signal generation device 450 to circuitry external to the RF signal generation device 450 and can facilitate retrieval of information (e.g., the log info 225 illustrated in FIG. 2, herein), as detailed herein.

In a non-limiting example, an apparatus includes a radio frequency (RF) signal generation device 450, which includes a memory component 454 and a processor 452 resident on the RF signal generation device 450 and coupled to the memory component 454. The processor 452 is configured to cause signaling generated by the RF signal generation device 450 to be applied to a memory device external to the apparatus (e.g., the memory device 230 illustrated in FIG. 2 and/or the memory device 330 illustrated in FIG. 3, herein). As discussed above, the signaling provides power to logic circuitry (e.g., the logic circuitry 222 illustrated in FIG. 2 and/or the logic circuitry 322 illustrated in FIG. 3, herein) and a memory resource (e.g., the memory resource 224 illustrated in FIG. 2 and/or the memory resource 324 illustrated in FIG. 3, herein) associated with the memory device. The processor 452 can be further configured to cause information corresponding to a health of the memory device or a functional state of the memory device, or both, to be retrieved from the memory resource of the memory device. As described above, in some embodiments, the memory resource of the memory device is a dedicated memory resource configured to store only the information corresponding to the health of the memory device or the functional state of the memory device.

Continuing with this example, the processor 452 can perform an operation using the information corresponding to the health of the memory device or the functional state of the memory device, or both, to determine a cause of failure for the memory device. Embodiments are not so limited, however, and in some embodiments, the processor 452 can perform an operation using the corresponding to the health of the memory device or the functional state of the memory device, or both, to determine operations to perform to triage the memory device and/or to perform such operations to triage the memory device.

In some embodiments, the processor 452 can cause information identifying the memory device to be retrieved from the memory device. In some embodiments, the information identifying the memory device can include a serial number of the memory device, a model number of the memory device, a manufacture date of the memory device, a location in which the memory device was manufactured, a batch number associated with the memory device, or any other such information that can identify the memory device.

Figure 5:
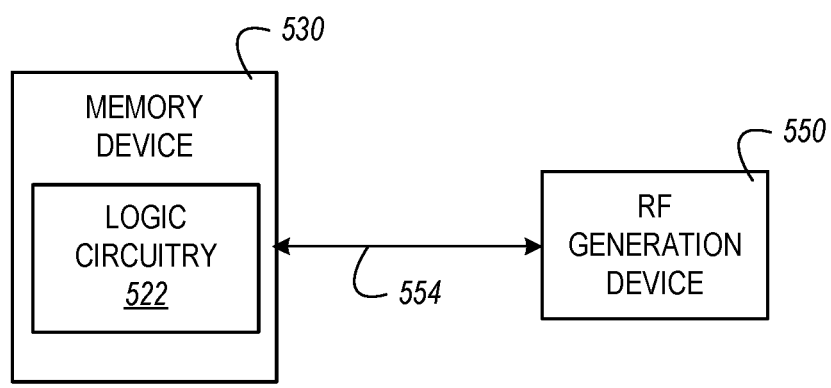
FIG. 5 illustrates an example radio frequency (RF) signal generation device that is communicatively coupled to logic circuitry via a communication path in accordance with some embodiments of the present disclosure.

FIG. 5 illustrates an example radio frequency (RF) signal generation device 550 that is communicatively coupled to a memory device that includes logic circuitry 522 via a communication path 554 in accordance with some embodiments of the present disclosure. The RF signal generation device 550 can be analogous to the RF signal generation device 450 described in connection with FIG. 4, herein. The memory device 530 can be analogous to the memory device 230 illustrated in FIG. 2 and/or the memory device 330 illustrated in FIG. 3, while the logic circuitry 522 can be analogous to the logic circuitry 222 and/or the logic circuitry 322 described in connection with FIG. 2 and FIG. 3, herein.

The communication path 554 can be a communication path that is provided "over-the-air," such as a radio frequency communication path. That is, in some embodiments, the communication path 554 may not require a physical connection or physical coupling in order to provide a signal pathway between the RF generation device 550 and the memory device 530 and/or the logic circuitry 522. That is, in some embodiments, the communication path 554 can allow for signals to travel between the RF generation device 550 and the logic circuitry 522 to provide power (e.g., to energize) the logic circuitry and/or to transfer information (e.g., log information such as the log information 225 illustrated in FIG. 2, herein) between the RF generation device 550 and the logic circuitry 522.

In a non-limiting example, a system includes a memory device 530 can include logic circuitry 522 coupled to a memory resource (e.g., the memory resource 224 illustrated in FIG. 2 and/or the memory resource 324 illustrated in FIG. 3, herein). The system further includes a radio frequency (RF) generation device 550 comprising a memory component (e.g., the memory component 454 illustrated in FIG. 4, herein) and a processor (e.g., the processor 452 illustrated in FIG. 4, herein). The RF generation device 550 can be communicatively coupled to the memory device 530 and/or the logic circuitry 522 via, for example, the communication path 554.

The logic circuitry 522 can control writing of information corresponding to a health of the memory device 530 or a functional state of the memory device 530, or both to the memory resource and receive RF signaling from the RF generation device 550 to provide power to the logic circuitry 522. In some embodiments, the logic circuitry 522 can cause the information corresponding to the health of the memory device 530 or the functional state of the memory device 530, or both, to be transferred to the memory component of the RF generation device 550.

Continuing with this example, the processor can be configured to control generation of the RF signaling to provide the power to the logic circuitry 522 and control receipt of the information corresponding to the health of the memory device 530 or the functional state of the memory device 530, or both. In some embodiments, the processor can control performance of an operation using the information corresponding to the health of the memory device 530 or the functional state of the memory device 530, or both, to determine conditions experienced by the memory device 530. Such conditions can include conditions that the memory device 530 experienced prior to experiencing a fault condition and/or a failure involving the memory device 530. For example, in some embodiments, the processor can determine conditions experienced by the memory device 530 that resulted in a fault condition and/or a failure of the memory device 530, as part of controlling performance of the operation using the information corresponding to the health of the memory device 530 or the functional state of the memory device 530, or both. As described above information corresponding to such conditions can be analyzed, for example, the RF generation device 550 to triage or otherwise diagnose and/or remedy the fault condition and/or failure experienced by the memory device 530.

Figure 6:
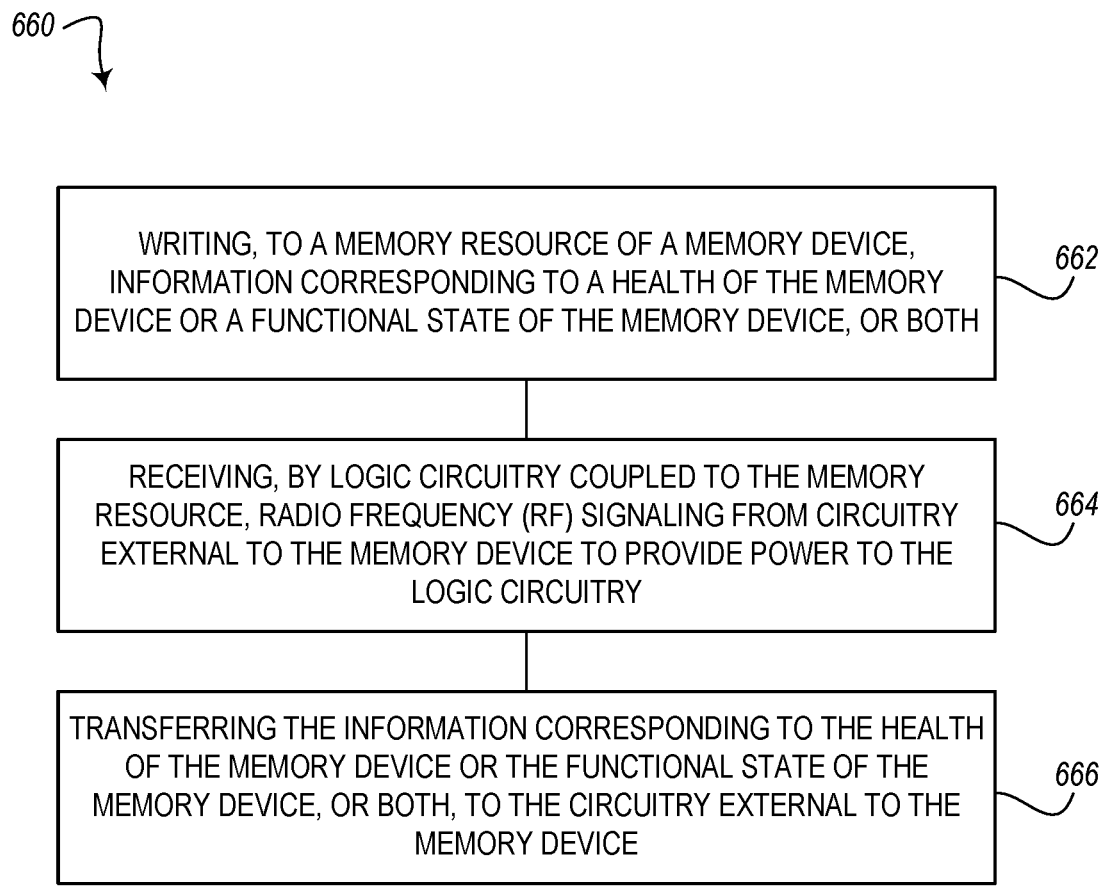
FIG. 6 is a flow diagram corresponding to a method for retrieval of log information from a memory device in accordance with some embodiments of the present disclosure.

FIG. 6 is a flow diagram corresponding to a method 660 for retrieval of log information from a memory device in accordance with some embodiments of the present disclosure. The method 660 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 660 is performed by the log information component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 662, the method 660 includes writing, to a memory resource (e.g., the memory resource 224 illustrated in FIG. 2 and/or the memory resource 324 illustrated in FIG. 3, herein) of a memory device (e.g., the memory device 230 illustrated in FIG. 2 and/or the memory device 320 illustrated in FIG. 3, herein), information corresponding to a health of the memory device or a functional state of the memory device, or both. As described above, the information corresponding to the health of the memory device and/or the functional state of the memory device can include log information (e.g., the log information 225 illustrated in FIG. 2, herein). For example, the information corresponding to the health of the memory device can include information associated with performance of a Self-Monitoring, Analysis and Reporting Technology operation, among other information corresponding to health of the memory device and/or the functional state of the memory device.

In some embodiments, the method 660 includes writing the information corresponding to the health of the memory device or the functional state of the memory device, or both to a dedicated memory resource (e.g., a memory resource that stores log information as opposed to user data or other data generally written to a memory device) of the memory device as part of writing the information corresponding to the health of the memory device or the functional state of the memory device, or both to the memory resource. As described above, writing the information corresponding to the health of the memory device or the functional state of the memory device, or both, to the memory resource of the memory device can be performed periodically while overwriting information corresponding to the health of the memory device or the functional state of the memory device, or both that was previously written to the memory resource of the memory device.

At operation 664, the method 660 includes receiving, by logic circuitry coupled to the memory resource, radio frequency (RF) signaling from circuitry external to the memory device to provide power to the logic circuitry. As described above, the circuitry that is external to the memory device can be a RF generation device, such as the RF generation device 450 illustrated in FIG. 4 and/or the RF generation device 550 illustrated in FIG. 5, which can include circuitry configured to generate the RF signaling and a memory component (e.g., the memory component 454 illustrated in FIG. 4, herein). In some embodiments, the method 660 can further include transferring the information corresponding to the health of the memory device or the functional state of the memory device, or both to the circuitry external to the memory device.

In some embodiments, the method 660 can include receiving the RF signaling from the circuitry external to the memory device to provide power to the logic circuitry subsequent to a determination that the memory device has experienced a failure that renders the memory device inoperable and/or transferring the information corresponding to the health of the memory device or the functional state of the memory device, or both, to the circuitry external to the memory device subsequent to the determination that the memory device has experienced the failure that renders the memory device inoperable. As described above, embodiments are not so limited, and in some embodiments the method 660 can include receiving the RF signaling from the circuitry external to the memory device to provide power to the logic circuitry subsequent to a determination that the memory device has experienced a fault condition that does not render the memory device inoperable and/or transferring the information corresponding to the health of the memory device or the functional state of the memory device, or both, to the circuitry external to the memory device subsequent to the determination that the memory device has experienced a fault condition that does not render the memory device inoperable.

At operation 666, the method 660 includes transferring the information corresponding to the health of the memory device or the functional state of the memory device, or both, to the circuitry external to the memory device. The information corresponding to the health of the memory device or the functional state of the memory device, or both can occur in response to the RF signaling received at operation 664. In some embodiments, the method 660 can include transferring information identifying the memory device to the circuitry external to the memory device in addition to transferring the information corresponding to the health of the memory device or the functional state of the memory device, or both, to the circuitry external to the memory device. As described above, the information identifying the memory device can include a serial number of the memory device, a model number of the memory device, a manufacture date of the memory device, a location in which the memory device was manufactured, a batch number associated with the memory device, or any other such information that can identify the memory device.

Figure 7:
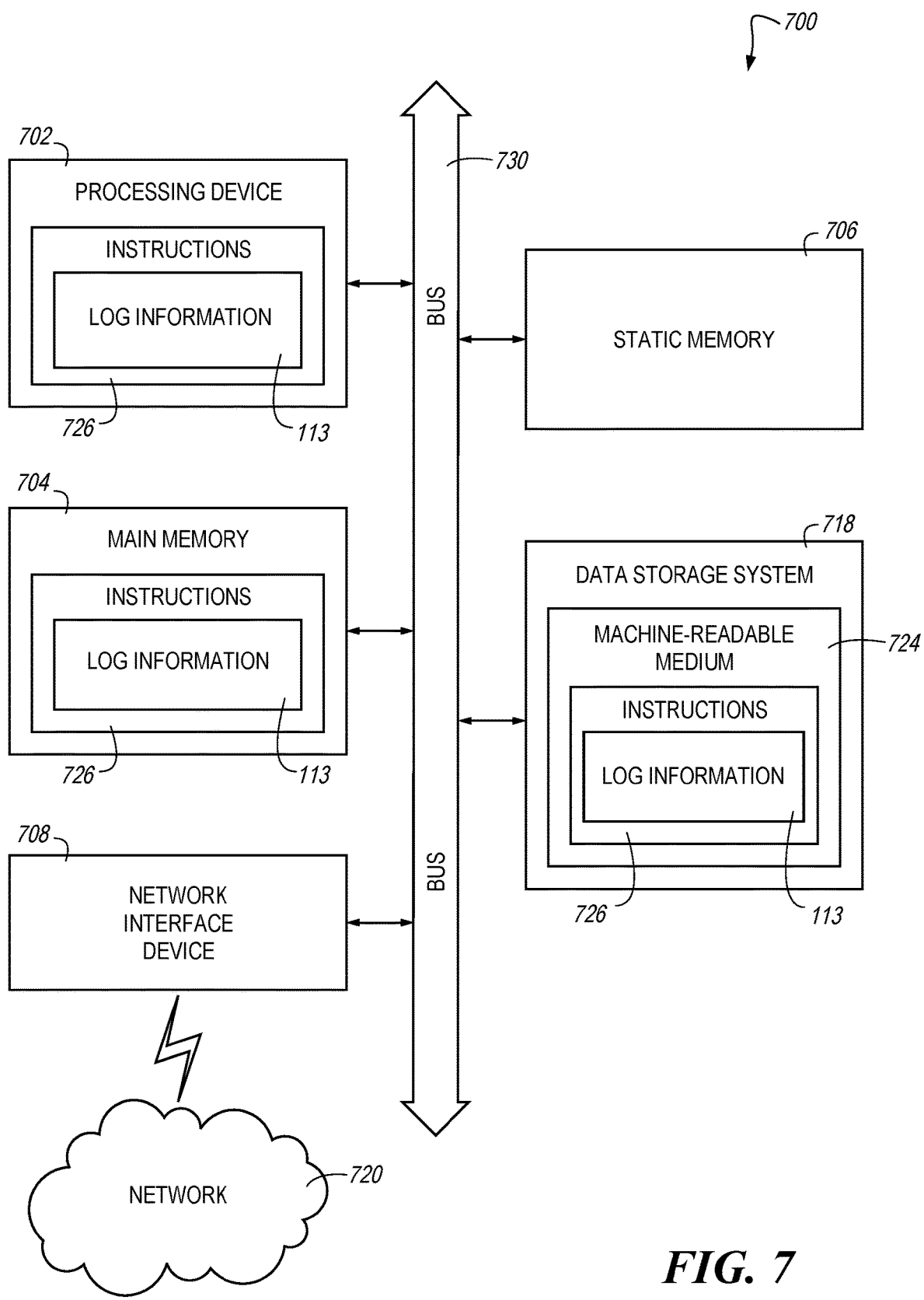
FIG. 7 is a block diagram of an example computer system in which embodiments of the present disclosure may operate.

FIG. 7 is a block diagram of an example computer system 700 in which embodiments of the present disclosure may operate. For example, FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the log information component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

The processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a log information component (e.g., the log information component 113 of FIG. 1) and/or logic circuitry (e.g., the logic circuitry 222, 322, and/or 522 of FIG. 2, FIG. 3, and/or FIG. 5). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   writing, to a memory resource of a memory device, information corresponding to a health of the memory device or a functional state of the memory device, or both;
   receiving, by logic circuitry coupled to the memory resource, radio frequency (RF) signaling from circuitry external to the memory device to provide power to the logic circuitry;
   transferring, in response to the RF signaling, the information corresponding to the health of the memory device or the functional state of the memory device, or both, to the circuitry external to the memory device;
   wherein the information corresponding to the health of the memory device or the functional state of the memory device, or both, is written to the memory resource periodically while overwriting information corresponding to the health of the memory device or the functional state of the memory device, or both, that was previously written to the memory resource of the memory device; and
   receiving the RF signaling from the circuitry external to the memory device to provide power to the logic circuitry subsequent to a determination that the memory device has experienced a failure that renders the memory device inoperable, or
   transferring the information corresponding to the health of the memory device or the functional state of the memory device, or both, to the circuitry external to the memory device subsequent to the determination that the memory device has experienced the failure that renders the memory device inoperable.

2. The method of claim 1, further comprising writing the information corresponding to the health of the memory device or the functional state of the memory device, or both to a dedicated memory resource of the memory device as part of writing the information corresponding to the health of the memory device or the functional state of the memory device, or both to the memory resource.

3. The method of claim 1, wherein the circuitry that is external to the memory device comprises circuitry configured to generate the RF signaling and a memory component, and wherein:
   the method further comprises transferring the information corresponding to the health of the memory device or the functional state of the memory device, or both to the circuitry external to the memory device.

4. The method of claim 1, wherein the information corresponding to the health of the memory device comprises information associated with performance of a Self-Monitoring, Analysis and Reporting Technology operation.

5. The method of claim 1, further comprising transferring information identifying the memory device to the circuitry external to the memory device in addition to transferring the information corresponding to the health of the memory device or the functional state of the memory device, or both, to the circuitry external to the memory device.

6. The method of claim 1, wherein the power provided to the logic circuitry is drawn from the RF signaling.

7. The method of claim 1, further comprising transferring the information corresponding to the health of the memory device or the functional state of the memory device, or both, to the circuitry external to the memory device over-the-air.

8. An apparatus, comprising:
a memory resource resident on a memory device; and
logic circuitry resident on the memory device and coupled to the memory resource, wherein the logic circuitry is configured to:
control writing of information corresponding to a health of the memory device or a functional state of the memory device, or both to the memory resource;
receive radio frequency (RF) signaling from circuitry external to the memory device to provide power to the logic circuitry; and
cause the information corresponding to the health of the memory device or the functional state of the memory device, or both, to be transferred to the circuitry external to the memory device in response to receipt of the RF signaling; and
wherein the logic circuitry is configured to receive the RF signaling from the circuitry external to the memory device to provide power to the logic circuitry and cause the information corresponding to the health of the memory device or the functional state of the memory device, or both, to be transferred to the circuitry external to the memory device after the memory device has experienced a fault condition.

9. The apparatus of claim 8, wherein the logic circuitry is further configured to draw power from the RF signaling to provide the power to the logic circuitry.

10. The apparatus of claim 8, wherein the fault condition is determined by a user of the memory device.

11. The apparatus of claim 8, wherein the fault condition comprises a condition in which the memory device has experienced a failure that renders the memory device inoperable.

12. The apparatus of claim 8, wherein the logic circuitry is further configured to cause information identifying the memory device to be transferred to the circuitry external to the memory device.

13. The apparatus of claim 8, wherein the logic circuitry is configured to cause the information corresponding to the health of the memory device or the functional state of the memory device, or both, to be transferred to the circuitry external to the memory device over-the-air.

14. The apparatus of claim 8, wherein the circuitry external to the memory device comprises:
a radio frequency (RF) signal generator;
a memory component; and
a controller coupled to the RF signal generator and the memory component, wherein the controller is configured to:
control generation of the RF signaling to provide the power to the logic circuitry;
control receipt of the information corresponding to the health of the memory device or the functional state of the memory device, or both; and
control performance of an operation using the information corresponding to the health of the memory device or the functional state of the memory device, or both, to determine a cause of failure for the memory device.

15. The apparatus of claim 8, wherein the logic circuitry is further configured to:
determine that information corresponding to the health of the memory device or the functional state of the memory device, or both, has been stored by the memory resource for greater than a threshold period of time; and
control writing of the information corresponding to the health of the memory device or the functional state of the memory device, or both, to the memory resource in response to the determination such that information corresponding to the health of the memory device or the functional state of the memory device, or both, that has been stored by the memory resource for greater than the threshold period of time is overwritten.

16. The apparatus of claim 8, wherein the logic circuitry is further configured to:
determine that a quantity of data associated with previously written information corresponding to the health of the memory device or the functional state of the memory device, or both, that has been written to the memory resource meets or exceeds a quantity of storage locations available to the memory resource; and
control writing of the information corresponding to the health of the memory device or the functional state of the memory device, or both, to the memory resource in response to the determination such that the previously written information corresponding to the health of the memory device or the functional state of the memory device, or both, is overwritten.

17. The apparatus of claim 8, wherein the logic circuitry is further configured to extract relevant information from the information corresponding to the health of the memory device or the functional state of the memory device, or both, to reduce a quantity of bits associated with the information corresponding to the health of the memory device or the functional state of the memory device, or both, prior to controlling writing of the information corresponding to the health of the memory device or the functional state of the memory device, or both to the memory resource.

18. An apparatus, comprising:
a radio frequency (RF) signal generation device;
a memory component; and
a processor resident on the RF signal generation device and coupled to the memory component, wherein the processor is configured to:
cause signaling generated by the RF signal generation device to be applied to a memory device external to the apparatus, the signaling to provide power to logic circuitry and a memory resource associated with the memory device such that the logic circuitry and the memory resource associated with the memory device draw power from the signaling; and
cause information corresponding to a health of the memory device or a functional state of the memory device, or both, to be retrieved from the memory resource of the memory device over-the-air; and
wherein the processor is configured to cause the signaling generated by the RF signal generation device to be applied to the memory device external to the apparatus, and cause information corresponding to the health of the memory device or the functional state of the memory device, or both, to be retrieved from the memory resource after the memory device has experienced a fault condition.

19. The apparatus of claim 18, wherein the memory resource of the memory device is a dedicated memory resource configured to store only the information corresponding to the health of the memory device or the functional state of the memory device, or both.

20. The apparatus of claim 18, wherein the processor is further configured to cause information identifying the memory device to be retrieved from the memory device.

21. The apparatus of claim 18, wherein the processor is further configured to perform an operation using the information corresponding to the health of the memory device or the functional state of the memory device, or both, to determine a cause of failure for the memory device.

22. The apparatus of claim 18, wherein the processor is further configured to perform an operation using the information corresponding to the health of the memory device or the functional state of the memory device, or both, to determine operations to perform to triage the memory device.

23. A system, comprising:
   a memory device comprising logic circuitry coupled to a memory resource; and
   a radio frequency (RF) generation device comprising a memory component and a processor, the RF generation device communicatively couplable to the memory device, wherein:
      the logic circuitry is configured to:
         control writing of information corresponding to a health of the memory device or a functional state of the memory device, or both to the memory resource;
         receive RF signaling from the RF generation device to provide power to the logic circuitry; and
         cause the information corresponding to the health of the memory device or the functional state of the memory device, or both, to be transferred to the memory component of the RF generation device, and wherein:
      the processor is configured to:
         control generation of the RF signaling to provide the power to the logic circuitry;
         control receipt of the information corresponding to the health of the memory device or the functional state of the memory device, or both; and
         control performance of an operation using the information corresponding to the health of the memory device or the functional state of the memory device, or both, to determine conditions experienced by the memory device;
      wherein the information corresponding to the health of the memory device or the functional state of the memory device, or both, is written to the memory resource periodically while overwriting information corresponding to the health of the memory device or the functional state of the memory device, or both, that was previously written to the memory resource of the memory device; and
      receiving the RF signaling from a circuitry external to the memory device to provide power to the logic circuitry subsequent to a determination that the memory device has experienced a failure that renders the memory device inoperable, or
      transferring the information corresponding to the health of the memory device or the functional state of the memory device, or both, to the circuitry external to the memory device subsequent to the determination that the memory device has experienced the failure that renders the memory device inoperable.

24. The system of claim 23, wherein the processor is further configured to determine conditions experienced by the memory device that resulted in a fault condition or the failure that renders the memory device inoperable, or both, as part of controlling performance of the operation using the information corresponding to the health of the memory device or the functional state of the memory device, or both.

* * * * *